W. E. LOTT.
BOLT LOCK FOR DEMOUNTABLE RIMS.
APPLICATION FILED MAR. 5, 1921.

1,415,938.

Patented May 16, 1922.

Inventor
W. E. Lott
By his Attorney
Wm. H. Reid.

UNITED STATES PATENT OFFICE.

WILLIAM E. LOTT, OF NEWARK, NEW JERSEY.

BOLT LOCK FOR DEMOUNTABLE RIMS.

1,415,938.　　　　Specification of Letters Patent.　　Patented May 16, 1922.

Application filed March 5, 1921.　Serial No. 449,979.

*To all whom it may concern:*

Be it known that I, WILLIAM E. LOTT, a citizen of the Dominion of Canada, and a resident of Newark, in the county of Essex and State of New Jersey, have invented certain new and useful Improvements in Bolt Locks for Demountable Rims, of which the following is a specification.

This invention relates to locking means for bolts or clamping devices of any sort and is particularly designed for the clamping members of demountable rims.

The object of this invention is to provide a device of this character in which the clamp or clip will be secured by the usual nut on the bolt but when it is desired to remove the rim, it is only necessary to give a partial turn of a special locking disc that will release the clamping piece and permit its removal without taking out the bolt.

In the accompanying drawing showing one embodiment of my invention, Fig. 1 is a side elevation of a portion of a wheel rim, with the device in place.

Figure 4:
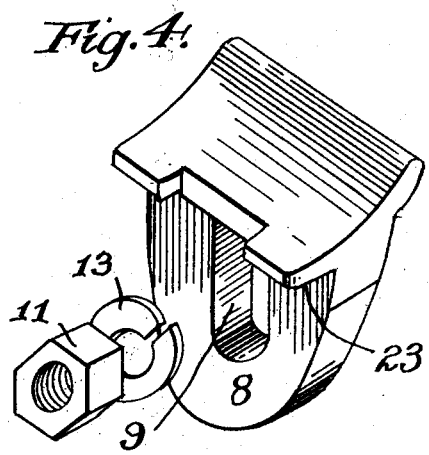

Fig. 4 indicates the clamp piece and the nut and spring washer.

Figure 5:
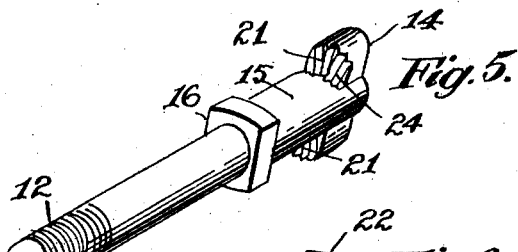

Fig. 5 shows the bolt.

Figure 6:
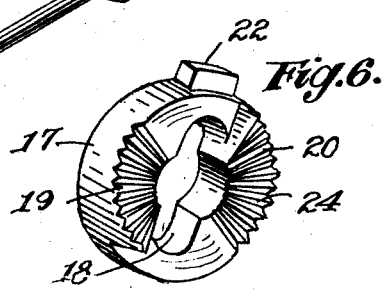

Fig. 6 shows a locking disc.

This invention is applicable to any use where a bolt serves to lock a member through which the bolt passes, and will permit release of the member by the partial turn of a locking disc.

Figure 1:
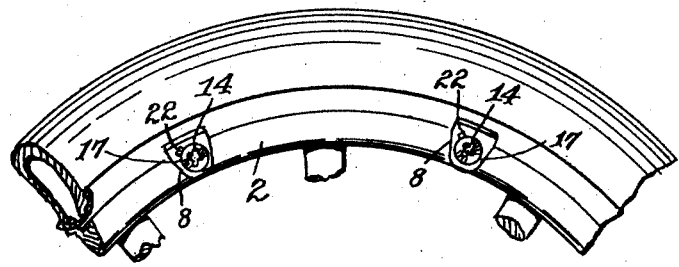
Figure 2:
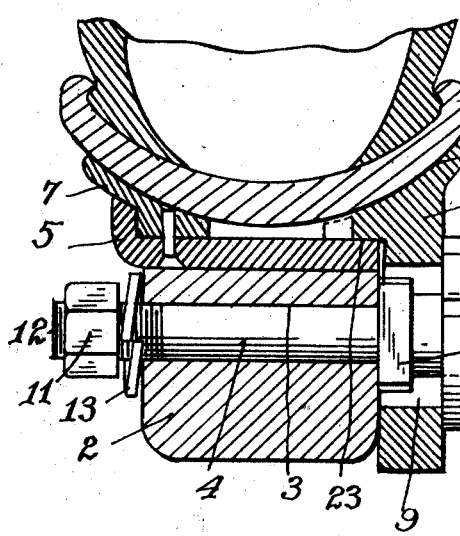
Fig. 2 is a cross section through the same.
Figure 3:
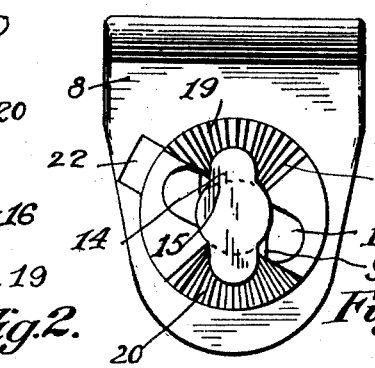
Fig. 3 is a side elevation of the parts shown in Fig. 2.

The invention is shown applied to a rim lock as used on motor vehicles for securing the demountable rim. I show a felly 2 having a bore 3, to receive the bolt 4, which felly has the usual base plate or back 5 secured thereto. The demountable rim 6 of any desired shape, is secured at one side by a clip 7, permanently secured to the felly or plate 5 as shown in Fig. 2. These parts can be of the usual or any desired construction. To secure the rim 6 on the other side I provide a clip 8, having a slot 9 therein, extending transverse to the rim, and which rim has a wedge portion 10 that when the clip is drawn toward the felly 3 by the bolt 4 will engage the rim 6 and together with the clip 7 will lock the rim to the felly, in the usual manner. It is understood that a series of these are arranged around the rim as indicated in Fig. 1.

The bolt 6 has the usual nut 11, on the threaded end 12, and also a spring washer 13, is shown placed between the nut and the felly, on the bolt. The other end of the bolt 4 is provided with a cross head, somewhat in the form of a pair of arms projecting oppositely thereon. The slot 9 in the clip 8 is of a size to permit passage of the head 14 therethrough, and if desired the end portion 15 of the bolt may be enlarged to provide greater strength, see Fig. 5. This end portion is provided with a flattened part, shown something like a flange 16, with two opposite flat sides, alining with the cross head 14. The purpose of this flattened portion is to engage the walls of the slot 9, and prevent turning of the bolt in the clip 8, as shown in Fig. 2.

I further provide a cam washer having a slot to pass over the cross head 14, and when turned on the bolt, to engage the clip 8, and force the bolt outwardly relative to the clip. This cam disc is shown in Fig. 6 in the form of a disc 17 having a slot 18, therein to permit it to pass over the cross head 14 and turn on the enlarged stem 15 of the bolt. The inner face 16 of the disc is shown flat while the outer face is provided on each side of the slot 18 with cam portions 19 and 20. It will be understood that this cam disc when placed on the bolt as in Fig. 2, and turned in one direction can have its cam face engage the inner walls of the cross head 14 and will force the cross head away from the clip. In the use of this arrangement the bolt is passed through the felly, and the clip and cam washer placed on the head end as shown. Thereupon the cam is turned a slight distance to bring the inner walls 21 of the cross head arms to engage the cam face, and then the spring washer 13, and the nut 11, are applied and the nut screwed up fairly tight. This will pull the bolt head against the cam disc, and the latter will force the clip 8, inwardly toward the felly to clamp the rim in position in the usual manner. Thereupon the cam ring is turned as by engagement with a lug 22 thereon by any suitable tool or hammer and this cam face will bind against the cross head and securely lock the clip against the rim. When it is desired to again remove the rim, the nut 11 does not need to be disturbed, but the cam disc is simply given a turn backward and by striking the lug 22 and the cross head will ride down the cam face, to relieve the pressure on the bolt. The cam face is turned until this slot registers with the cross head, when the disc can be removed from the bolt head. This will free the clip 8 that can also be removed from the bolt, and the rim is now loose on the felly. The flattened portion 16 of the bolt serves to prevent its turning relative to the clip 8 and the latter can not turn because of the ledge 23 thereon engaging the felly.

The engaging face of the cam disc and of the cross head can be made rough or ridged as shown by 24 to act as a kind of lock.

What I claim is:

1. The combination with a clamping member having a slotted opening, of a bolt having a cross head at one end, a nut on the other end of the bolt, a cam disc having a slot to permit passage of the bolt head and having a cam face on one side opposite each wall of the slot, adapted to engage the arms of the cross head, whereby turning of the disc in one direction will advance it on the bolt away from the head, said bolt having a flattened portion below the cross head to engage the slotted opening in the clamp piece to prevent turning of the bolt on the clamping member.

2. The combination with a clamping member having an 22 opening, of a bolt having a cross head at one end, a cam disk having a slot to permit passage of the bolt head and having a cam face on one side opposite each wall of the slot, said face being adapted to engage the arms of the cross head whereby turning of the disk in one direction will advance it on the bolt away from said head, said bolt and clamping member being provided with cooperating means arranged to prevent turning of the bolt on the clamping member.

Signed at New York city, N. Y., on February 25, 1921.

WILLIAM E. LOTT.